(12) United States Patent
Billmers et al.

(10) Patent No.: US 7,480,048 B1
(45) Date of Patent: Jan. 20, 2009

(54) MONOCHROMATOR EMPLOYING SINGLE GRATING VOLUME HOLOGRAMS AND METHOD OF USE

(76) Inventors: Richard I. Billmers, 4 Tanglewood Dr., Langhorne, PA (US) 19047; Elizabeth J. Billmers, 4 Tanglewood Dr., Langhorne, PA (US) 19047; Mary E. Ludwig, 7 Buttonbush Ct., Elkton, MD (US) 21921; Joseph David Matchett, 436 7th Ave., Lindenwold, NJ (US) 08021

( * ) Notice: Subject to any disclaimer, the term of this patent is extended or adjusted under 35 U.S.C. 154(b) by 0 days.

(21) Appl. No.: 11/796,290

(22) Filed: Apr. 28, 2007

Related U.S. Application Data

(60) Provisional application No. 60/797,753, filed on May 5, 2006.

(51) Int. Cl.
*G01J 3/18* (2006.01)
(52) U.S. Cl. .................................. 356/334; 356/328
(58) Field of Classification Search ................ 356/334, 356/318, 326, 328, 330, 331, 332, 333
See application file for complete search history.

(56) References Cited

U.S. PATENT DOCUMENTS

2004/0218178 A1* 11/2004 Farr ........................... 356/326

* cited by examiner

*Primary Examiner*—Kara E Geisel
*Assistant Examiner*—Abdullahi Nur
(74) *Attorney, Agent, or Firm*—Ted Masters

(57) ABSTRACT

The present invention is directed to a monochromator device which uses single grating volume holograms. The holograms collect light of varying wavelengths such as polychromatic light, and separate one particular wavelength of interest. A wide wavelength spectrum can be targeted, either by angularly tuning the holograms, or by using an array of holograms each of which is tuned to a different center wavelength. The large aperture and high angular dispersion of the volume holograms provides a higher light throughput than that of prior art monochromators. The present invention can be used anywhere that efficient separation of polychromatic light into its narrowband components is required. The monochromator may be placed immediately before a light source, or before other optical or signal processing devices to provide the filtered wavelength of light input to such devices.

9 Claims, 6 Drawing Sheets

Fig_1

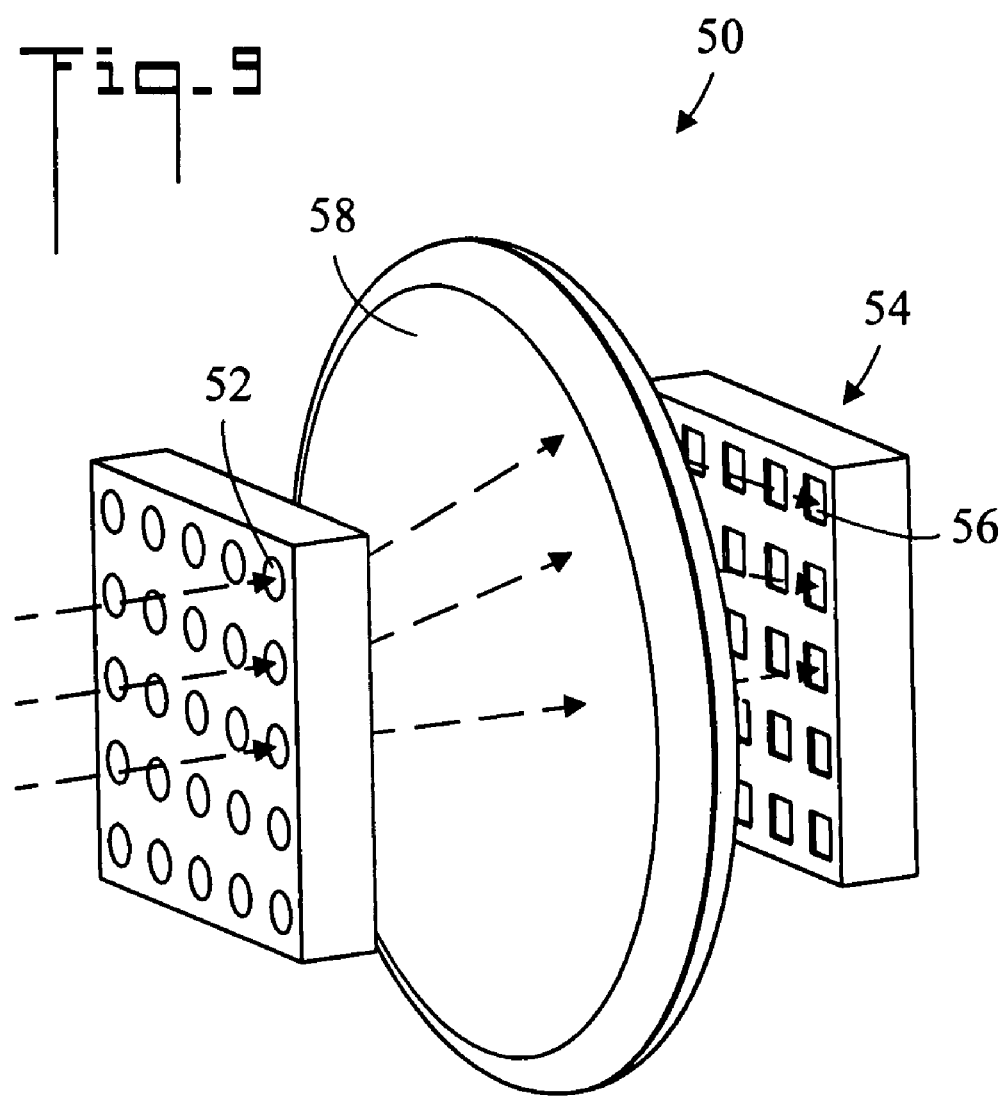

MONOCHROMATOR EMPLOYING SINGLE GRATING VOLUME HOLOGRAMS AND METHOD OF USE

CROSS REFERENCE TO RELATED APPLICATION

This application claims the filing benefit under 35 U.S.C. §119(e) of U.S. Provisional Application No. 60/797,753, filed May 5, 2006, which is included herein by reference.

TECHNICAL FIELD

The present invention pertains generally to monochromators which separate a narrow band of wavelengths of light or other radiation from a wider range of input wavelengths. More particularly the monochromator uses a plurality of single grating volume holograms to effect the separation.

BACKGROUND OF THE INVENTION

Conventional monochromators use ruled diffraction surface gratings, which have fairly low angular dispersion. In such conventional monochromators, as light is passed from one ruled grating to the next and through a small aperture at the exiting end of the monochromator, the intensity of the filtered light leaving the system is substantially lower than that of the light entering the system in the same spectral band. Also, to improve spectral resolution when using weakly dispersive elements, conventional monochromators typically use spatial filtering, a technique where small apertures, or slits, are used to allow only the desired wavelength to pass through the monochromator. However, when spatial filters are used to improve spectral resolution, a portion of the light of the selected wavelength which enters the monochromator is blocked by the aperture at the output. Additionally, several feet of path length (long distances between optical elements) are used to improve spatial separation of wavelengths in a device with low angular dispersion.

Volume holograms (also known as volume holographic optical elements) consist of volume holographic diffraction gratings written in photosensitive material. Volume holograms accept one wavelength band of light, transmit or reflect that wavelength depending on their write geometry, and filter out all other wavelengths of light by only transmitting the desired wavelength band at a selected angle. The wavelength band that is accepted is controlled by the angle at which the hologram is positioned with respect to the incoming light. As this incident angle is changed, the wavelength band accepted also changes.

BRIEF SUMMARY OF THE INVENTION

The present invention is directed to a small, lightweight monochromator device which uses single grating volume holograms to collect light of varying wavelengths and separates one particular wavelength from the polychromatic light. Key features of the design of the present invention include an increase in the efficiency of the monochromator (i.e. more light of the desired wavelength) and an increase of the spectral resolution compared with existing monochromators.

The volume holograms used in the present invention produce larger angular dispersion than do conventional surface gratings. As such, the large angular dispersion of the volume holograms monochromator leads to a device that has higher resolution, higher efficiency, and a more compact design. This device uses volume holograms to accept a wide spectrum of wavelengths with high spectral resolution. Either by angular tuning of two or more narrow spectral bandwidth holograms, or by using an array of volume holograms disposed on one photosensitive element, a spectral range of approximately 100 nm can be scanned. Additionally, due to the high angular acceptance of the volume holographic gratings, the small apertures used in conventional monochromators can be either removed or replaced by large apertures in the present invention, thereby increasing light throughput.

One possible application of the present invention is for use in a mobile Raman spectroscopy device. Raman spectroscopy is the measurement of the wavelength and intensity of scattered light whose wavelengths shift from that of the incident light due to molecular vibrations. In order to differentiate between similar species which have very weak signals, a device is required that can separate wavelengths with high resolution and high efficiency. The volume holographic grating monochromator is an ideal candidate to be used in such a system because of its spectral resolution.

In accordance with a preferred embodiment of the invention, a monochromator for processing incoming light includes a plurality of single grating volume holograms.

In accordance with an aspect of the invention, incoming polychromatic light is directed at a first single grating volume hologram, filtered by the first hologram, passed by the first hologram to a second single grating volume hologram, and further filtered by the second hologram.

In accordance with another aspect of the invention, the first hologram is angularly rotatable with respect to the incoming light, and the second hologram is angularly rotatable with respect to the light passed by the first hologram to the second hologram.

In accordance with another aspect of the invention, the first hologram is written to pass light at a first center wavelength, and the second hologram is written to pass light at a second center wavelength different from the first center wavelength.

In accordance with another aspect of the invention, the first hologram is written to pass light of a given center wavelength at a first angle, and the second hologram is written to pass light of same given center wavelength at a second angle different from the first angle.

In accordance with another aspect of the invention, the first hologram has an operating aperture. The incoming light is passed through an input aperture before being directed at the first hologram, the input aperture being greater than or equal to the operating aperture of the first hologram.

In accordance with another aspect of the invention, the second hologram is written with a planar reference wave and has an operating aperture. The light exiting the second hologram is passed through an output aperture, the output aperture being greater than or equal to the operating aperture of the second hologram.

In accordance with another aspect of the invention, the monochromator includes a plurality of cascaded hologram stages which sequentially narrow the spectral bandwidth of the observed light.

Other aspects of the present invention will become apparent from the following detailed description, taken in conjunction with the accompanying drawings, which illustrate, by way of example, the principles of the invention.

DETAILED DESCRIPTION OF THE INVENTION

Figure 1:
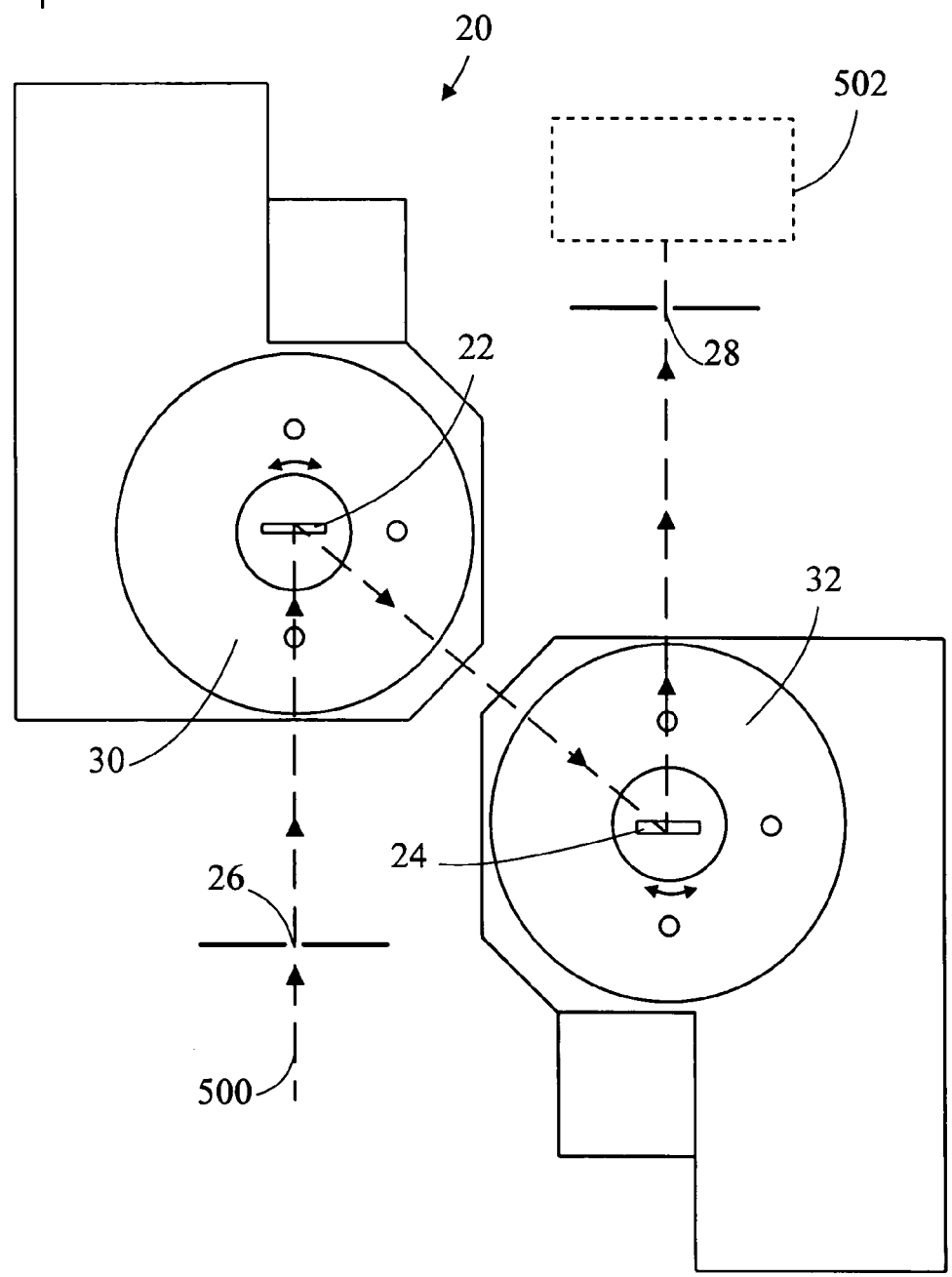
FIG. 1 is a top plan view of a monochromator in accordance with the present invention.

Referring initially to FIG. 1, there is illustrated a top plan view of a monochromator for processing incoming light in accordance with the present invention, generally designated as 20. Monochromator 20 includes a plurality of single grating volume holograms. In the shown embodiment monochromator 20 includes a first single grating volume hologram 22 and a second single grating volume hologram 24. Incoming polychromatic light 500 is directed at first hologram 22, filtered by first hologram 22, passed by first hologram 22 to second hologram 24, and further filtered by second hologram 24, and then passed to an external device such as a detector 502 which in the shown embodiment is not part of the present invention. It is noted that incoming polychromatic light 500 may be collimated as shown, or may have various incident angles.

There are two general types of volume holograms: single grating volume holograms and multiplexed holograms. A single grating volume hologram comprises one holographic pattern written into a three dimensional piece (volume) of photosensitive material. There are no other holograms written in the same volume of the material. Additional single grating volume holograms may be written in the same photosensitive material substrate, as long as they do not occupy the same volume as each other (i.e., side by side). A multiplexed hologram is a series of different holograms written within the same volume of a photosensitive material. The present invention utilizes single grating volume holograms.

A hologram can be written with two different types of reference wave. The first is a planar reference wave. A planar reference wave is a beam that is collimated and interacts with the material into which the hologram is written at one specific angle; however, if the incoming and outgoing beams are both planar, the angles at which the input and exit beams may be different. The second type is a spherical reference wave. This is a beam which either converges or diverges as it reaches or leaves the holographic material. Due to this, a hologram written with a spherical reference wave will accept a wider range of angles from incoming light than a one written with a planar wave. In the present invention, first 22 and second 24 holograms (or additional holograms, refer to FIG. 4 and the associated discussion) may be constructed with either a planar reference wave, or a spherical reference wave.

Traditional monochromators have small input apertures, commonly referred to as "slits" into which incoming light enters the monochromator. This small size input aperture can be a problem in that it reduces the light throughput of the device. Volume holograms however have an operating aperture which is defined by the physical size of the grating, and which is usually larger than the slits in conventional monochromators. As such, volume holograms do not require the small input aperture of traditional monochromators. To this end, in the present invention monochromator 20 has an input aperture 26 for passing incoming light 500 which is greater than or equal to the operating aperture of first hologram 22. Similarly, for holograms written with a planar reference wave, monochromator 20 also includes an output aperture 28 for passing light from second hologram 24 which is greater than or equal to the operating aperture of the second hologram 24.

First hologram 22 and second hologram 24 are disposed on angular positioning instruments 30 and 32 respectively. As the holograms have their angle of incidence with the incoming light changed, they will pass a different wavelength band. This change in wavelength passed through the monochromator is referred to as "tuning." Tuning components 30 and 32 allow for the system to be tuned over a broad range of wavelengths. Each desired wavelength can be examined at a corresponding combination of angular tuning of each hologram (also refer to FIG. 2 and the associated discussion).

Figure 2:
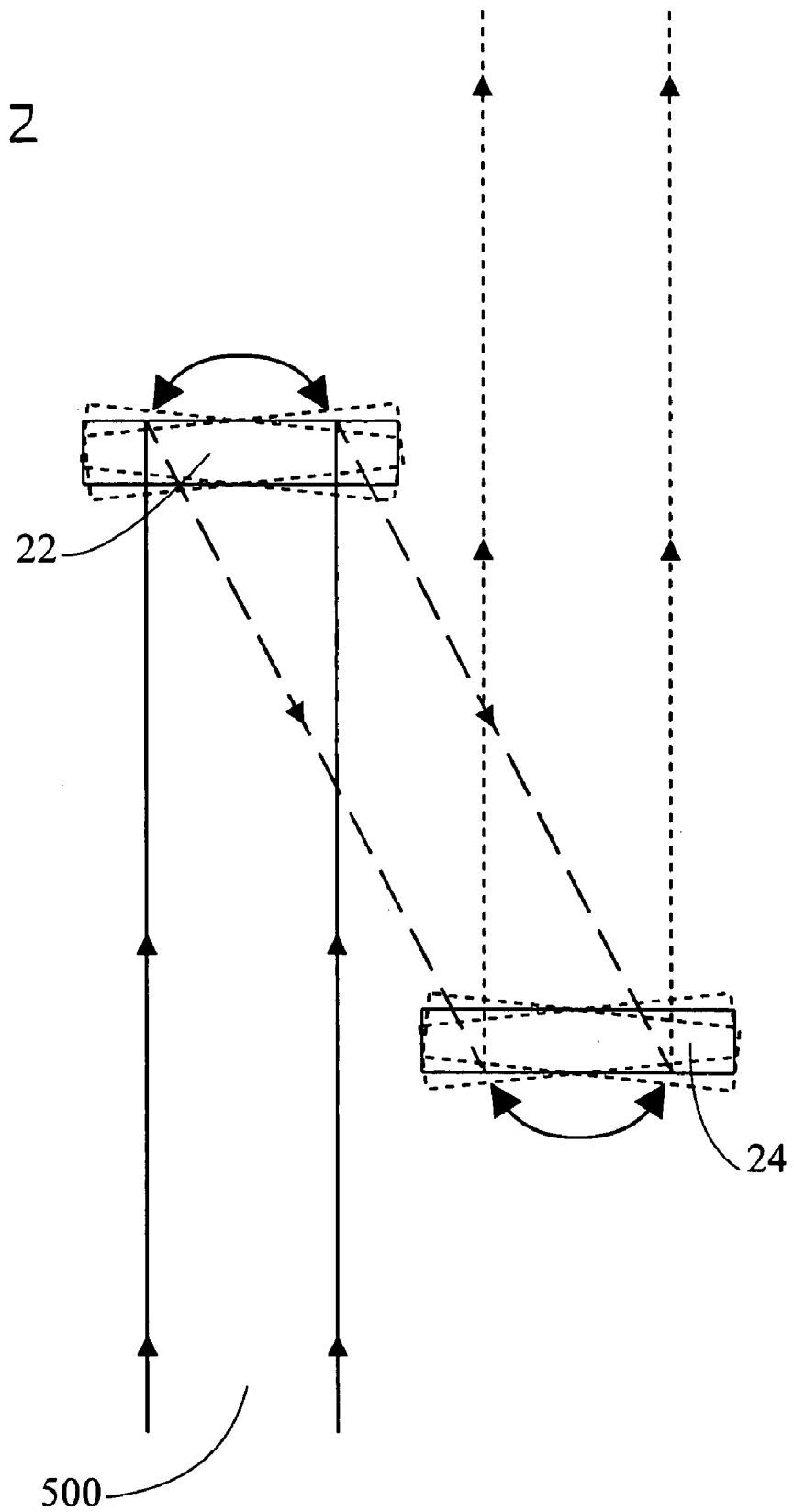
FIG. 2 is a functional diagram showing how light passes through the monochromator.

FIG. 2 is a functional diagram showing how light passes through monochromator 20. In the diagram, light of different wavelengths is represented by different line styles (i.e. the solid lines are unfiltered polychromatic light, the dashed lines represent light filtered by first hologram 22, and the dotted lines represent light further filtered by second hologram 24. While FIG. 2 shows one incident angle as well as holograms with a reflective writing geometry, it may be appreciated that the present invention could be adapted for any incident angle, and could also be made with transmissive rather than the shown reflective holograms.

In an embodiment of the invention, first hologram 22 is angularly rotatable with respect to incoming light 500, and second hologram 24 is angularly rotatable with respect to the light passed by first hologram to second hologram 24. The properties of volume holograms allow the central wavelength accepted by the hologram to be tuned by slightly adjusting the angle of the hologram relative to the incident light. The angle can be adjusted by means of, for example, precision rotation stages, piezo-electric devices, or any other method of achieving small rotations about the hologram axis. At a different central wavelength, the light accepted by the hologram will be reflected at a different angle than the original central band was. By tuning the hologram in this manner to accept different wavelength bands, the monochromator of the present invention can be used for a broad array of applications without the need for a new device at a different acceptance wavelength. In addition, by packaging the proper motion equipment and control programs with the device, it can be made rapidly tunable for purposes of scanning selected wavelength ranges.

Tuning of the monochromator is accomplished by angularly positioning (rotating) first hologram 22, and then angularly positioning second hologram 24 to partially overlap the wavelength band accepted by first hologram 22. The process of tuning the holograms will change not only the wavelength that is output, but also the angle at which it is transmitted or reflected. Therefore, when first hologram 22 is tuned, second hologram 24 will then need to be tuned as well, to get it back within the range of the transmission of first hologram 22. Each hologram may be tunable over a range about one thousand times it's bandwidth, i.e. a 0.1 nm bandpass hologram may be tunable over 100 nm. This relationship is an approximation, not a hard and fast rule. Some tuning may be achieved by only rotating second hologram 24, however a broader tuning range is available if both first hologram 22 and second hologram 24 are tuned together.

Figure 3:
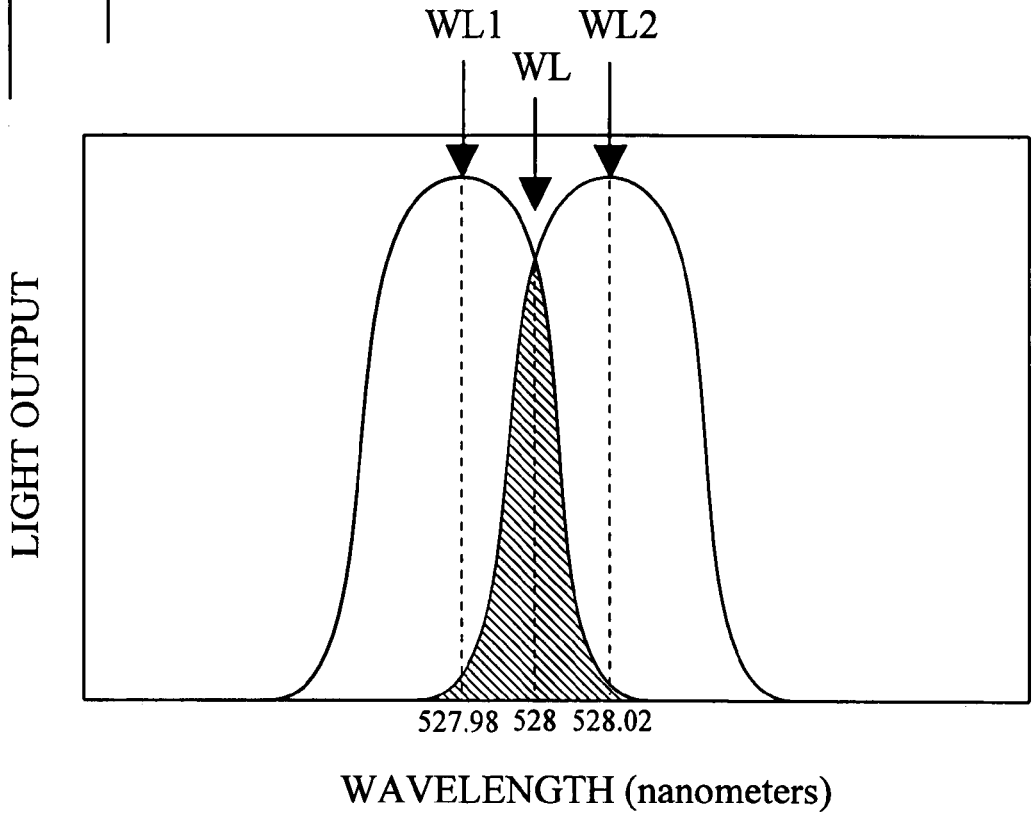
FIG. 3 is a graph showing the spectral bandwidth of one embodiment of the monochromator.

Referring now to FIG. 3, there is illustrated a graph showing the spectral bandwidth of one embodiment of monochromator 20. There are two ways to define the bandpass of monochromator 20. One way (shown) is to construct the holograms such that second hologram 24 is written to accept a wavelength band which is slightly offset from that of first hologram 22. Another way is to have the holograms constructed to accept the same wavelength band, but be set at different angles thereby creating a slight disparity between the wavelength band that each passes. In both of these cases, each of the holograms filter out all light except for a narrow, nearly monochromatic bandwidth. In FIG. 3, first hologram 22 is written to pass light at a first center wavelength WL1, and second hologram 24 is written to pass light at a second center wavelength WL2 which is different from first center wavelength WL1. Because the central wavelength of each hologram differs slightly, there is a small overlap of the wavelength bands that they both allow. This overlap creates an intermediate bandwidth centered at WL which is narrower than that of either hologram alone. This ultra-narrowband signal (shaded area) is the only wavelength range which passes through monochromator 20.

For example, in the graph WL1 is 527.98 nanometers, WL2 528.02 is nanometers, and WL is 528 nanometers. The shaded area is the overlap created by the two holograms. Although this particular bandwidth is centered at 528 nm, and can be tuned over a broad bandwidth, the volume holographic monochromator can have a central wavelength anywhere in the spectrum from the ultraviolet region to the infrared region. Although the spectral resolution will not vary far from what is shown in the figure as the monochromator is tuned for a variety of wavelength regions, the spectral throughput may differ at other wavelengths. In the present invention a wide spectrum (around 100 nm) can be targeted by angularly tuning holograms 22 and 24.

Similarly, for the second (angular) way of defining the bandpass, the first and second holograms may be written to accept the same central wavelength, and diffract it at different angles relative to the surface of the hologram. In this case, first hologram 22 is written to pass light of a given center wavelength at a first angle A1, and second hologram 24 written to pass light of the same center wavelength at a second angle A2 which is different from first angle A1.

Figure 4:
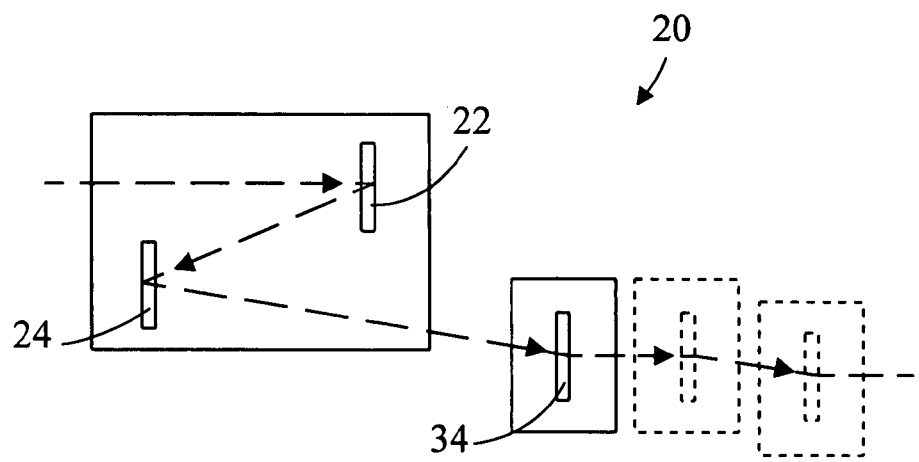
FIG. 4 is a functional diagram of the monochromator using additional hologram stages.

FIG. 4 is a functional diagram of monochromator 20 using additional hologram stages. Although volume holograms pass only a narrow bandwidth, there is a physical minimum bandwidth that a single grating volume hologram can provide. However, by providing a plurality of these holograms in series with the central wavelengths slightly tuned off from one another will allow for a bandpass whose linewidth becomes narrower with each hologram added. For this reason, monochromator 20 uses a minimum of two holograms. In FIG. 4, at least one additional single grating volume hologram 34 is added for further processing light from second hologram 24, wherein the light filtered by second hologram 24 is passed to the at least one additional hologram 34. It may be appreciated that this "cascading" can continue by adding additional hologram stages.

Figure 5:
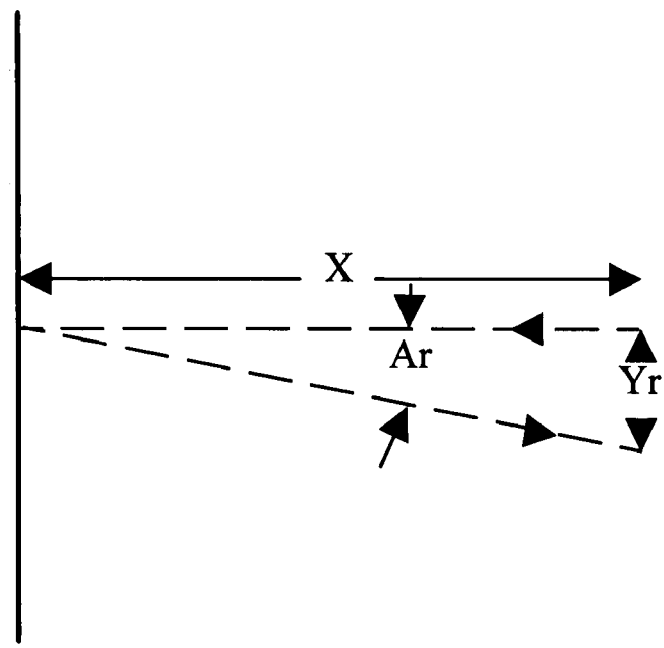
FIG. 5 is a diagram of the angular dispersion of a prior art ruled grating.
Figure 6:
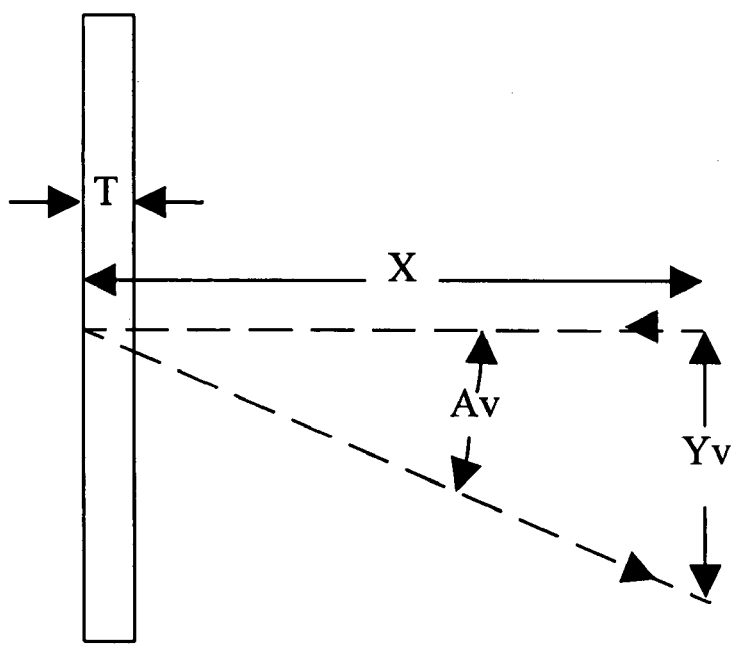
FIG. 6 is a diagram of the angular dispersion of the single grating volume holograms of the present invention.

Depending upon the specific application, an acceptable range of grating parameters for the present invention is:
First Hologram 22
Write configuration: reflection or transmission
Beam type: spherical or planar
Material type: any photosensitive material into which a volume hologram can be written, including but not limited to photo-sensitive glass, photopolymers, and crystals
Central Wavelength: ultraviolet to infrared
Second Hologram 24
Write configuration: reflection is preferred to decrease spectral bandpass, although transmission could be used
Beam type: same as for first hologram
Material type: any photosensitive material into which a volume hologram can be written
Central Wavelength: ultraviolet to infrared In one tested embodiment of the invention, the following grating parameters were utilized:
First Hologram 22
Write configuration: reflection—allows narrowest bandpass possible
Beam type: planar
Material type: inorganic photosensitive silicate glass
Material thickness: 5 mm
Central Wavelength: 640 nm—this choice is dependant upon the particular application
Second Hologram 24
Write configuration: reflection—allows narrowest bandpass possible
Beam type: planar
Material type: inorganic photosensitive silicate glass
Material thickness: 5 mm
Central wavelength: 640 nm FIG. 5 is a diagram of the angular dispersion of a prior art ruled grating, and FIG. 6 is diagram of the angular dispersion of the single grating volume holograms of the present invention. For any given length X, the angle of light diffraction of the ruled grating Ar is less than that of the volume hologram Av. This larger diffraction angle Av results in a larger spacing Yv between the diffracted light of different wavelengths for volume holograms as compared to the spacing Yr of ruled gratings. In addition, a volume hologram has only one strongly diffracted wavelength band for a given incident angle, whereas ruled gratings will diffract the entire spectrum into different angles at once. The larger spacing of the diffracted light in the present invention results in higher wavelength resolution. While FIGS. 5 and 6 show reflective writing geometry, it may be appreciated that the present invention could include any incident angle and could also be made transmissive.

In terms of use, a method for tuning monochromator 20 includes:
(a) providing incoming light 500 having multiple wavelengths;
(b) providing monochromator 20 including:
a first single grating volume hologram 22;
a second single grating volume hologram 24;
first hologram 22 being angularly rotatable with respect to incoming light 500;
second hologram 24 being angularly rotatable with respect to the light passed by first hologram 22 to second hologram 24;
(c) directing incoming light 500 at first hologram 500 wherein incoming light 500 is filtered by first hologram 22, passed by first hologram 22 to second hologram 24, and further filtered by second hologram 24; and,
(d) angularly rotating second hologram 24 to accept a desired wavelength passed by first hologram 22.

The method further including:
before step (d), angularly rotating first hologram 22 to accept a desired wavelength from incoming light 500.

Figure 7:
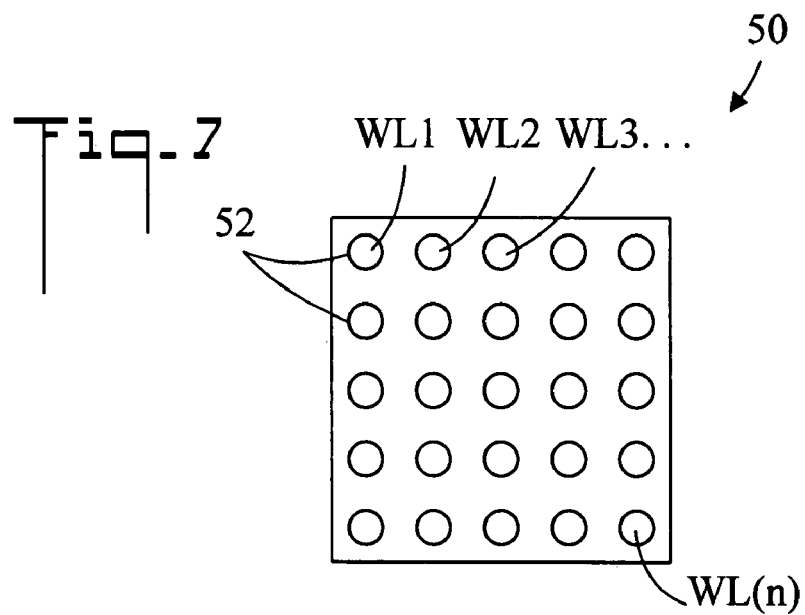
FIG. 7 is a front elevation view of a second embodiment of the present invention.

FIG. 7 is a front elevation view of a second embodiment of the present invention, generally designated as 50. In this embodiment a narrow wavelength band may be selected from a broad wavelength band without the need for mechanical tuning. In monochromator 50 a plurality of single grating volume holograms 52 are arranged in a pattern wherein each hologram 52 is spatially separated from all other holograms 52. The separation ensures that the light diffracted by one hologram will not interfere with that of the other holograms in the pattern. Additionally, each hologram 52 is written to pass light at a different center wavelength from all other holograms 52. In the shown embodiment, the plurality of holograms 52 are arranged in a grid, such as the shown 5 by 5 array. In this embodiment, there are 25 holograms 52, wherein, hologram 1 passes light at a center wavelength WL1, hologram 2 at a center wavelength WL2, hologram 3 at a center wavelength WL3, etc, up to hologram (n) at a center frequency WL(n) (hologram 25 at center frequency WL25 as shown). Although the array shown in FIG. 9 consists of 25 volume holograms 52, it may be appreciated that the array could consist of any number of holograms 52 as allowed by the size of each hologram 52 and the size of the photosensitive material up which the holograms 52 are written. It may also be appreciated that the pattern of holograms 52 could be arranged in patterns other than a grid. In an embodiment of the invention, the holograms 52 have a width of about 1 millimeter, and are spaced apart about one-half millimeter.

Figure 8:
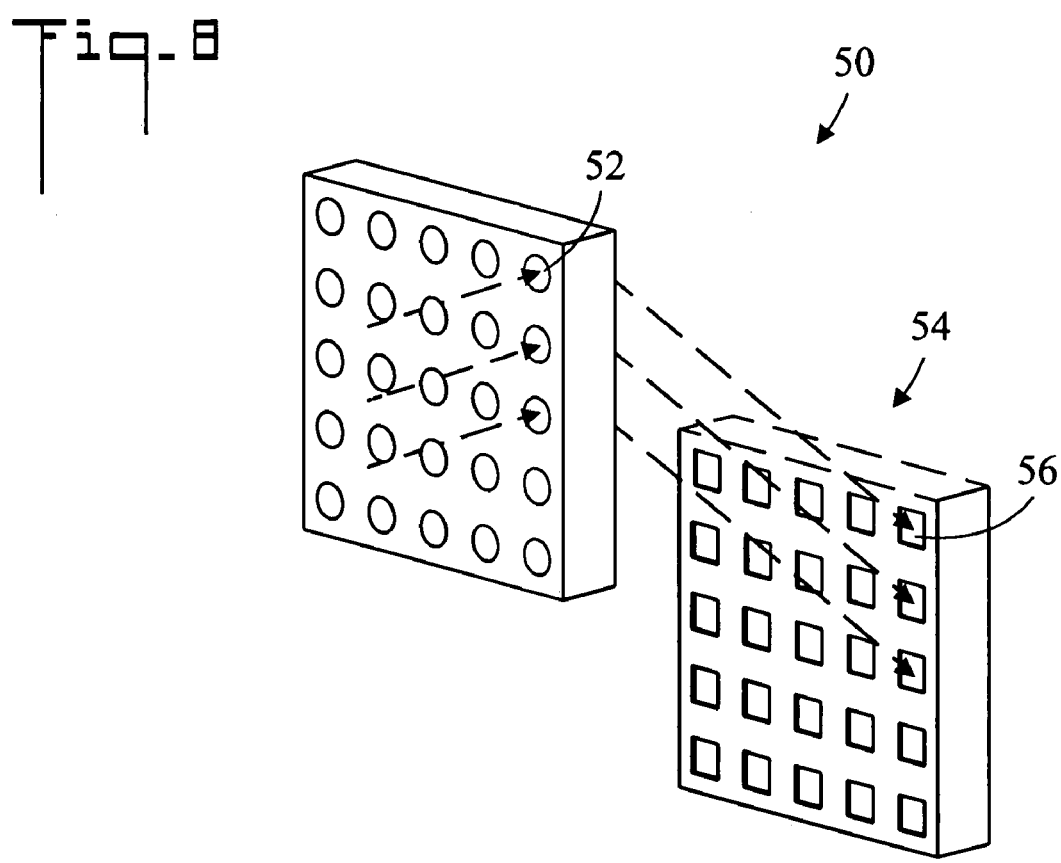
FIG. 8 is a perspective view of the second embodiment including a detector; and, FIG. 9 is a perspective view of the second embodiment in which collection optics are disposed between the holograms and the detector.

FIG. 8 is a perspective view of the second embodiment which includes a detector 54 for detecting the output of monochromator 50. Detector 54 can be, for example, a charge coupled device (CCD) or a linear photodiode array (LPA). Detector 54 has a plurality of spatially separated input channels 56 equal to the plurality of holograms 52 in monochromator 50 (25 input channels in the shown embodiment). After the incoming, polychromatic light reaches the monochromator 50, each hologram 52 in the pattern passes a unique, narrowband spectrum of light and will diffract the light at a chosen angle. Monochrometer 50 and detector 54 are spatially arranged, and each hologram 52 is written, so that each hologram 52 passes light to one and only one input channel 56. As such, a desired wavelength band may be observed by selecting the proper input channel 56 on detector 54 and observing the detector output of the selected input channel. By this method, a large spectrum would be covered by monochromator 50 without the need for mechanical tuning.

Also, because detector 54 will most likely have input channels 56 which are much smaller than the size of holograms 52, the holograms 52 in the pattern must be spherical. This means that holograms 52 will actually serve three purposes: in addition to filtering the chosen wavelength and diffracting it towards detector 54 at a chosen angle, the holograms 52 will also cause the light to focus at a point where the filtered light beam will be equal to or smaller than the size of input channel 56

FIG. 9 is a perspective view of the second embodiment in which collection optics 58 (such as a lens) are disposed between the holograms 52 and the detector 54. After the input light is filtered by holograms 52, it travels through collection optics 58 which are disposed between holograms 52 and detector 54, and is directed at detector 54 so that the filtered signal from each hologram 52 is directed to its own unique input channel 56. The collection optics are useful by causing the entire field of light transmitted by the array to match the size of a pre-determined detector as well as ensuring that only the desired light reaches each corresponding input channel 56. As with monochromator 20, the plurality of single volume holograms 52 may be constructed with either a planar reference wave, or a spherical reference wave, and may accept collimated light or light coming from various angles of incidence.

In terms of using monochromator 50, a method for selecting a wavelength from a plurality of wavelengths includes:

(a) providing incoming light 500 having multiple wavelengths;

(b) providing monochromator 50 including:
   a plurality of single grating volume holograms 52 arranged in a pattern wherein each hologram 52 is spatially separated from all other holograms 52;
   each hologram 52 is written to pass light at a different center wavelength from all other holograms 52;
   a detector 54 having a plurality of spatially separated input channels 56 equal to the plurality of holograms 52, wherein light received by each input channel 56 is processed by detector 54 and delivered as a detector output;
   each hologram 52 written so that it passes light to one and only one input channel 52;

(c) directing incoming light 500 at the plurality of single grating volume holograms 52; and, (d) selecting the detector output of a desired input channel 56.

The preferred embodiments of the invention described herein are exemplary and numerous modifications, variations, and rearrangements can be readily envisioned to achieve an equivalent result, all of which are intended to be embraced within the scope of the appended claims.

We claim:

1. A monochromator for processing incoming light, comprising:
   a plurality of single grating volume holograms;
   a first single grating volume hologram;
   a second single grating volume hologram;
   wherein the incoming light is directed at said first hologram, filtered by said first hologram, passed by said first hologram to said second hologram, and further filtered by said second hologram;
   said second hologram being angularly rotatable with respect to said light passed by said first hologram to said second hologram; and,
   said first hologram being angularly rotatable with respect to the incoming light.

2. The monochromator according to claim 1, further including:
   said first hologram written to pass light at a first center wavelength; and,
   said second hologram written to pass light at a second center wavelength different from said first center wavelength.

3. The monochromator according to claim 2, further including:
   said first hologram passing a first spectral bandwidth;
   said second hologram passing a second spectral bandwidth; and,
   said first and second spectral bandwidths overlapping to form an intermediate bandwidth which is narrower than both said first spectral bandwidth and said second spectral bandwidth.

4. A monochromator for processing incoming light, comprising:
   a plurality of single grating volume holograms;
   a first single grating volume hologram;
   a second single grating volume hologram;
   wherein the incoming light is directed at said first hologram, filtered by said first hologram, passed by said first hologram to said second hologram, and further filtered by said second hologram;
   said first hologram having an operating aperture; and, an input aperture for passing the incoming light to said first hologram, said input aperture being greater than or equal to said operating aperture of said first hologram.

5. A monochromator for processing incoming light, comprising:
- a plurality of single grating volume holograms;
- a first single grating volume hologram;
- a second single grating volume hologram;
- wherein the incoming light is directed at said first hologram, filtered by said first hologram, passed by said first hologram to said second hologram, and further filtered by said second hologram;
- said second hologram written with a planar reference wave;
- said second hologram having an operating aperture; and,
- an output aperture for passing light from said second hologram, said output aperture being greater than or equal to said operating aperture of said second hologram.

6. A monochromator for processing incoming light, comprising:
- a plurality of single grating volume holograms;
- a first single grating volume hologram;
- a second single grating volume hologram;
- wherein the incoming light is directed at said first hologram, filtered by said first hologram, passed by said first hologram to said second hologram, and further filtered by said second hologram;
- said second hologram being angularly rotatable with respect to said light passed by said first hologram to said second hologram;
- said first hologram being angularly rotatable with respect to the incoming light;
- one of (1) said first hologram written to pass light at a first center wavelength, and said second hologram written to pass light at a second center wavelength different from said first center wavelength, and (2) said first hologram written to pass light of a given center wavelength at a first angle, and said second hologram written to pass light of said given center wavelength at a second angle different from said first angle;
- said first hologram having an operating aperture;
- an input aperture for passing the incoming light to said first hologram, said input aperture being greater than or equal to said operating aperture of said first hologram;
- said second hologram written with a planar reference wave;
- said second hologram having an operating aperture; and,
- an output aperture for passing light from said second hologram, said output aperture being greater than or equal to said operating aperture of said second hologram.

7. Method for tuning a monochromator, comprising:
(a) providing incoming light having multiple wavelengths;
(b) providing a monochromator including:
- a first single grating volume hologram;
- a second single grating volume hologram;
- said first hologram being angularly rotatable with respect to said incoming light;
- said second hologram being angularly rotatable with respect to said light passed by said first hologram to said second hologram;

(c) directing said incoming light at said first hologram wherein said incoming light is filtered by said first hologram, passed by said first hologram to said second hologram, and further filtered by said second hologram; and,
(d) angularly rotating said second hologram to accept a desired wavelength passed by said first hologram.

8. The method of claim 7, further including:
before step (d), angularly rotating said first hologram to accept a desired wavelength from said incoming light.

9. The method of claim 7, further including:
- in step (a), said first hologram written to pass light at a first center wavelength;
- said second hologram written to pass light at a second center wavelength different from said first center wavelength;
- said first hologram passing a first spectral bandwidth;
- said second hologram passing a second spectral bandwidth; and,
- said first and second spectral bandwidths overlapping to form an intermediate bandwidth which is narrower than both said first spectral bandwidth and said second spectral bandwidth.

* * * * *

UNITED STATES PATENT AND TRADEMARK OFFICE
CERTIFICATE OF CORRECTION

PATENT NO. : 7,480,048 B1
APPLICATION NO. : 11/796290
DATED : January 20, 2009
INVENTOR(S) : Richard I. Billmers et al.

It is certified that error appears in the above-identified patent and that said Letters Patent is hereby corrected as shown below:

Title Page; item (60);
Related U.S. Application Data Should Read:

"Provisional Application No. 60/797,753, filed on May 5, 2006, and is a CIP of Application No. 11/197,796, filed on August 5, 2005 (now Patent 7,355,768) which claims benefit of Provisional Application No. 60/601,538, filed August 14, 2004"

Signed and Sealed this

Twenty-first Day of April, 2009

JOHN DOLL
*Acting Director of the United States Patent and Trademark Office*